UNITED STATES PATENT OFFICE.

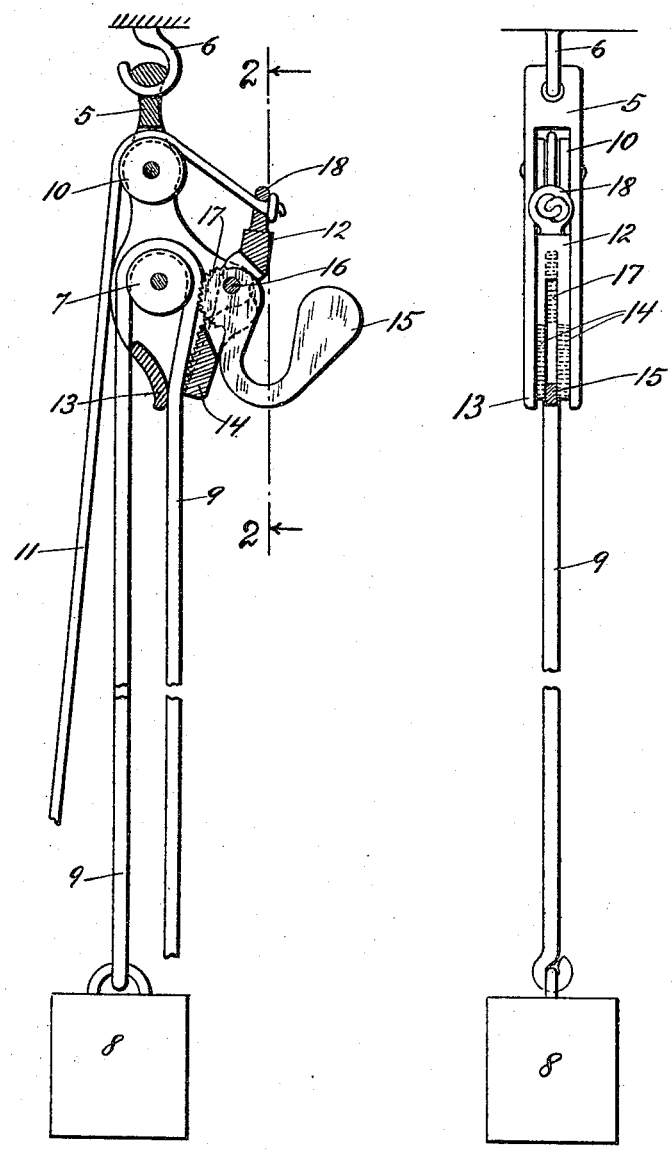

ALPHONSE VANDERDONCK, OF BROOKLYN, NEW YORK.

ROPE-GRIP.

1,188,858.   Specification of Letters Patent.   Patented June 27, 1916.

Application filed April 1, 1914. Serial No. 828,924.

*To all whom it may concern:*

Be it known that I, ALPHONSE VANDERDONCK, a citizen of the United States, residing in the borough of Brooklyn, in the county of Kings and State of New York, have invented certain new and useful Improvements in Rope-Grips, of which the following is a specification, reference being had therein to the accompanying drawing.

My invention relates to improvements in rope grip, and may be employed for use in combination with hoisting pulleys, clothes lines, automobile brakes, dumbwaiters, awnings, and various other uses.

In the accompanying drawings, I have illustrated an application of my invention although of course it will be understood that the invention may be applied in many other uses.

In the said drawings, Figure 1 indicates the application of my invention to a hoisting pulley in which it is shown partly in cross section and partly broken away. Fig. 2 is a view looking at right angles at Fig. 1.

Referring to Fig. 1, 5 indicates my improved form of pulley or block suspended in any suitable manner as by the hook 6. 7 indicates the pulley wheel from which the material is suspended such as the weight 8 by any suitable means such as the rope 9. 10 indicates another pulley wheel over which passes the control rope 11 secured to the brake mechanism 12. The lower portion of the casing of the pulley or block, it will be observed, terminates in a sort of lip 13 and the lower portion of the brake mechanism, it will also be observed, is provided with teeth such as 14 which are adapted to bear against the rope 9 and force the same against the lip 13 of the casing of the pulley. 15 is a counter-weight or safety lever also pivoted upon the bearing 16 with the brake and which serves to normally keep the teeth 14 of said brake against the rope 9. From this it will be seen that as the weight 8 is elevated by pulling on the right hand side of the rope 9, looking at Fig. 1, the free end of the rope 9 may be released and the weight will remain in its hoisted position, being securely bound between the lip 13 of the casing and the teeth 14 of the brake by virtue of the counter-weight or lever 15. The upper portion of the counter-weight, it will also be observed, is provided with teeth such as 17 which with the brake serve as a double clutch to additionally bind the rope 9. To release the rope 9 and its weight or the material secured thereto, it is only necessary to pull upon the brake rope 11, engaging the top of the brake at 18 as shown, whereupon the teeth 14—17 are pulled clear of the rope 9 and allow the weight to descend freely. By this means it will be readily seen that great weights may be raised upon a single pulley in a block and the weight of the same taken off the arms of the person hoisting the same by means of the brake as aforesaid. It will also be readily understood that after the weight has been taken to the desired point and removed, or at any stage in the proceeding, the same may be released and allowed to return to its original position.

Of course it will be understood that the device is susceptible of use in many applications not shown or described herein and the invention is not limited to the particular applications herein set forth.

I claim:

A pulley adapted to receive a rope and having a pulley block frame, a brake member upon said frame adapted to retain the pulled side of said rope except when same is pulled or released, and means for releasing the same, and a weighted engaging member in combination with said brake member also adapted to retain said rope upon the pulled side except when released therefrom.

In testimony whereof I hereunto affix my signature in the presence of two witnesses.

ALPHONSE VANDERDONCK.

Witnesses:
 JACOB HIMMEBREICH,
 WILLIAM HIMMEBREICH.

Copies of this patent may be obtained for five cents each, by addressing the "Commissioner of Patents, Washington, D. C."